Figure 1:
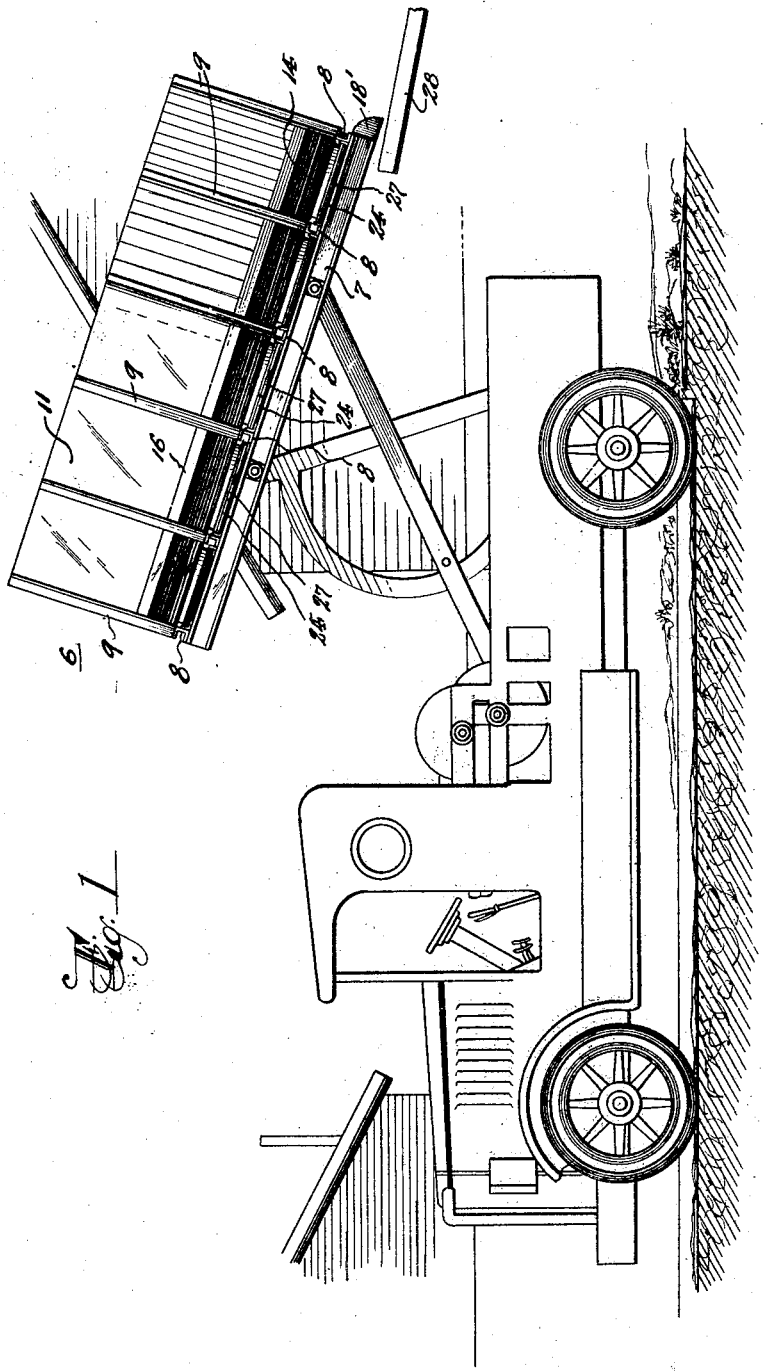

May 27, 1930.  P. M. THORN  1,760,093
COAL TRUCK BODY
Filed April 23, 1929   2 Sheets-Sheet 1

INVENTOR
*Percy M. Thorn*,
BY
*George D. Richards*
ATTORNEY

May 27, 1930.  P. M. THORN  1,760,093
COAL TRUCK BODY
Filed April 23, 1929   2 Sheets-Sheet 2
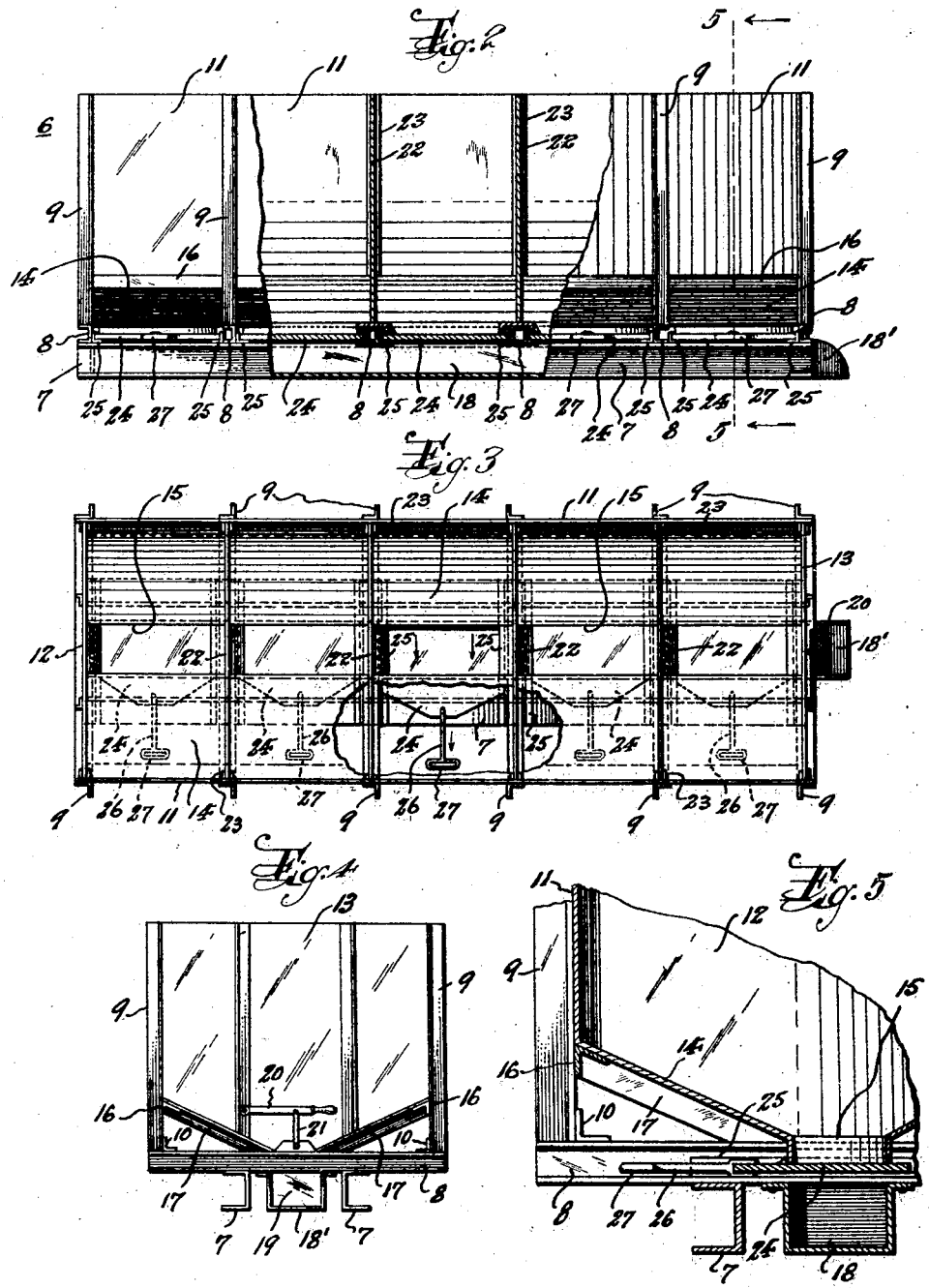
INVENTOR
Percy M. Thorn,
BY
George D. Richards
ATTORNEY Patented May 27, 1930

1,760,093

UNITED STATES PATENT OFFICE

PERCY M. THORN, OF LONG ISLAND CITY, NEW YORK

COAL-TRUCK BODY

Application filed April 23, 1929. Serial No. 357,383.

This invention relates, generally, to improvements in coal delivery truck bodies; and the invention relates, more particularly, to a novel construction of truck body which may be utilized to carry a plurality of load units, and which includes means for discharging any selected load unit at will regardless of the position it occupies within the body.

In connection with the retail distribution of coal, it is frequently desirable to convey in a single delivery truck a plurality of load units to be respectively carried to different destinations. In the ordinary delivery truckbody, a plurality of different load units may be carried by transversely partitioning the body interior to provide separate compartments for the same. Use of the trucks so arranged, especially when of the dumping type adapted to discharge the contents thereof from the rear end, frequently involves difficulties in making delivery, since the discharge of the load units must of necessity take place in consecutive order, beginning with the rear end compartment, and consequently, if for any reason discharge of the rearward compartment or compartments cannot immediately be made at destination thereof, no delivery can in the meantime be made of the contents of the forward compartments, except by hand discharge, hence delays in delivery occur, and valuable working time of both truck and operator is lost, all of which adds no little to the delivery expense or overhead.

It is therefore the principal object of this invention to provide a novel construction and arrangement of delivery truck body for coal or other materials, and especially of the rear-end dumping type, which will not only permit the carrying of a plurality of different load units scheduled for different destinations, but which will permit of selective dumping discharge of any one of the several load units regardless of its position within the truck body or with relation to the rear-end of the latter.

Other objects of this invention, not at this time more particularly enumerated, will be clearly understood from the following detailed description of the same.

The invention is illustrated in the accompanying drawings, in which:—

Fig. 1 is a side elevation of a truck of the rear-end dumping type (conventionally shown) and provided with a body made according to and embodying the principles of this invention; Fig. 2 is in part a side elevation and in part a vertical longitudinal section of the novel truck body; Fig. 3 is a top or plan view of the same; Fig. 4 is a rear end view of the same; and Fig. 5 is a fragmentary transverse vertical section, taken on line 5—5 in Fig. 2.

Similar characters are employed in all of the hereinabove described views to indicate corresponding parts.

Referring now to said drawings, the reference character 6 indicates the novel truck body per se, the same comprising, in the illustrative embodiment shown, in which the frame-work and body is of metal construction, a pair of laterally spaced longitudinal supporting or base beams 7 upon which is mounted the skeleton frame consisting of a series of transverse horizontal bottom bars 8, having at their ends vertical frame bars 9 suitably joined thereto by angle-pieces or brackets 10. Suitably secured to the vertical frame bars 9 are the side walls 11, front end wall 12 and rear end wall 13 of the body enclosure. The reference character 14 indicates the bottom walls of the body, the same preferably consisting of opposed inwardly and downwardly inclined bottom members extending respectively from the side walls 11, but terminating short of the central longitudinal axis of the body bottom so as to provide a central longitudinal bottom opening 15 throughout the extent of the body bottom. Said bottom members are supported by longitudinal side rails 16, which are secured to the vertical frame bars 9, and by underlying reenforcing transverse reenforcing ribs 17 which extend beneath the bottom members, and which are suitably secured to and between said side rails and said bottom bars 8. Extending longitudinally beneath the body bottom, and being suitably secured to said bottom bars 8 so as to be aligned with the bottom opening 15 and coextensive therewith, is a fixed discharge chute 18, having an open discharge end 18' projecting rearwardly beyond the rear end wall 13 of the body. Vertically slidable at the rear end of the body structure is a cut-off plate or closure 19, which may be lowered into the rear end of the discharge chute interior to close the same against the outflow of material therefrom, and which may be manipulated or adjusted to regulate the discharge flow of coal outwardly from said discharge chute. A pivoted lever 20 connected with the plate or closure 19 by the link 21 may be utilized to manipulate said plate or closure 19, as may be desired.

The interior of the body may be subdivided into a plurality of compartments, each adapted to contain a load unit. Said compartments are formed by transverse partition members 22. These partition members 22 may be removably mounted by providing channeled guides 23 on the interior faces of the side walls 11 in which the same are slidably movable.

From the description as thus far proceeded with, it will be obvious that each compartment, into which the interior of the truck body is divided, is provided with a bottom opening above and adapted to communicate with the interior of said discharge chute 18. The bottom opening of each compartment is individually closed by a manipulatable closure means, each said closure means being subject to operation independent of the others so that any given or selected compartment may be opened to discharge its content to the discharge chute 18. The compartment bottom closures may be made in various ways, and illustrative of one convenient form thereof, I have, in the drawings, shown the same to consist of slide plates 24 movable in horizontal guides 25, the exterior end of each slide plate having a draw bar 26 connected therewith, to project outwardly in the exteriorly open space beneath a sloping bottom wall 14 of the body, so as to be readily accessible to the operator from an exterior side of the body. Each draw bar 26 preferably terminates in a handle loop 27 for grasping the same when manipulating a slide plate.

The novel truck body above described may be mounted on a truck chassis or frame of either horse-drawn or motor vehicle type as shown in Fig. 1, and any suitable arrangement of means for elevating and inclining the body to rear end dumping position may be provided intermediate the chassis or frame and the truck body, as is likewise illustrated in Fig. 1 of the drawings.

In the operation of the delivery truck having the novel load carrying body above described, when it is desired to discharge any one of the load units in a given compartment thereof, the body is uptilted to incline downwardly from its forward toward its rear end, as shown in Fig. 1. When the body is so tilted, the slide plate controlling the bottom opening of the selected compartment to be discharged or dumped is pulled open, thus permitting the content of said compartment to flow outwardly and downwardly therefrom into the underlying discharge chute 18. By opening and adjusting the cut-off plate or closure of said discharge chute, the coal or other material may be exteriorly discharged from the rear end of the body for delivery into a temporary chute 28 or other means, whereby the same may be conveyed to the desired ultimate place or destination. It will be obvious that, since the discharge chute 18 is a permanent fixture of the truck body, and since the same is common to all compartments into which the interior of the truck body is divided, any desired compartment, regardless of its position, may be readily and easily discharged or dumped by manipulating the closure or slide plate 24 associated therewith.

From the above description it will be clearly apparent, that the novel truck body of this invention provides a very convenient and efficient means for carrying and selectively delivering a plurality of load units, and consequently the body offers great advantage in use as a coal delivery means.

While I have stressed the advantage of the novel truck body as a coal carrying and delivery means, it will be understood that it is not limited to such specific use, but may also be utilized to carry a plurality of load units of other materials, or of a variety of different materials.

As many changes could be made in the construction involved in this invention and many apparently widely different embodiments of this invention could be made without departing from the scope thereof, it is intended that all matter contained in the above description or shown in the accompanying drawings shall be interpreted as illustrative and not in a limiting sense.

I claim:—

1. In a truck of the tiltable rear-end dumping type, a body for said truck comprising side and end walls, and a bottom wall having a discharge opening; means to subdivide the interior of said body into separate load unit carrying compartments; a fixed discharge chute underlying the bottom wall opening of said body, and having an open discharge end at the rear of said body; and a manipulatable closure device for each compartment intermediate the bottom wall discharge opening of said body and said discharge chute.

2. In a truck of the tiltable rear-end dumping type, a body for said truck comprising side and end walls, and a bottom wall having a discharge opening; means to subdivide the interior of said body into separate load unit carrying compartments; a fixed discharge chute underlying the bottom wall opening of said body, and having an open discharge end at the rear of said body; a manipulatable closure device for each compartment intermediate the bottom wall discharge opening of said body and said discharge chute, and an adjustable cut-off plate cooperative with the rear open end of said discharge chute.

3. In a truck of the tiltable rear-end dumping type, a body for said truck comprising side and end walls, and bottom wall members projecting in downwardly and inwardly inclined extension from the respective side walls with their inner longitudinal margins spaced apart to provide a bottom discharge opening; means to subdivide the interior of said body into separate load unit carrying compartments; a fixed discharge chute underlying the bottom discharge opening of said body, and having an open discharge end at the rear of said body; and a manipulatable closure device for each compartment intermediate the bottom discharge opening and said discharge chute.

4. In a truck of the tiltable rear-end dumping type, a body for said truck comprising side and end walls, and bottom wall members projecting in downwardly and inwardly inclined extension from the respective side walls with their inner longitudinal margins spaced apart to provide a bottom discharge opening; means to subdivide the interior of said body into separate load unit carrying compartments; a fixed discharge chute underlying the bottom discharge opening of said body, and having an open discharge end at the rear of said body; a manipulatable closure device for each compartment intermediate the bottom discharge opening and said discharge chute, and an adjustable cut-off plate cooperative with the rear open end of said discharge chute.

5. In a truck of the tiltable rear-end dumping type, a body for said truck comprising side and end walls, and bottom wall members projecting in downwardly and inwardly inclined extension from the respective side walls with their inner longitudinal margins spaced apart to provide a bottom discharge opening; means to subdivide the interior of said body into separate load unit carrying compartments; a fixed discharge chute underlying the bottom discharge opening of said body, and having an open discharge end at the rear of said body; and a manipulatable slide plate for each compartment to open and close the bottom discharge opening underlying said compartments, guides for said slide plates, said slide-plates each having a draw bar projecting exteriorly of said body for selectively manipulating the same.

6. In a truck of the tiltable rear-end dumping type, a body for said truck comprising side and end walls, and bottom wall members projecting in downwardly and inwardly inclined extension from the respective side walls with their inner longitudinal margins spaced apart to provide a bottom discharge opening; means to subdivide the interior of said body into separate load unit carrying compartments; a fixed discharge chute underlying the bottom discharge opening of said body, and having an open discharge end at the rear of said body; a manipulatable slide plate for each compartment to open and close the bottom discharge opening underlying said compartments, guides for said slide plates, said slide-plates each having a draw bar projecting exteriorly of said body for selectively manipulating the same, and an adjustable cut-off plate cooperative with the rear open end of said discharge chute.

In testimony that I claim the invention set forth above I have hereunto set my hand this 8th day of April 1929.

PERCY M. THORN.